United States Patent [19]

Kim

[11] Patent Number: 5,488,592
[45] Date of Patent: Jan. 30, 1996

[54] OPTICAL PICKUP DEVICE FOR MAGNETO-OPTICAL DISC REPRODUCING SYSTEM

[75] Inventor: Jin Tae Kim, Seoul, Rep. of Korea

[73] Assignee: Daewoo Electronics Co., Ltd., Seoul, Rep. of Korea

[21] Appl. No.: 337,493

[22] Filed: Nov. 8, 1994

[30]     Foreign Application Priority Data

Nov. 11, 1993 [KR] Rep. of Korea ............... 93-23870

[51] Int. Cl.$^6$ ............................................. G11B 11/00
[52] U.S. Cl. ........................ 369/13; 369/112; 369/110
[58] Field of Search ................... 369/13, 112, 110, 369/44.14, 44.23, 44.15, 44.16, 44.21; 360/114, 59

[56]                References Cited

U.S. PATENT DOCUMENTS

| 4,764,912 | 8/1988 | Ando et al. | 369/13 |
|---|---|---|---|
| 4,926,490 | 5/1990 | Tsuyuguchi et al. | 369/112 |
| 5,020,041 | 5/1991 | Nakao et al. | 369/13 |
| 5,099,470 | 3/1992 | Matsubayashi | 369/13 |
| 5,105,399 | 4/1992 | Shimonoli | 369/13 |
| 5,157,649 | 10/1992 | Suzuki | 369/110 |
| 5,337,300 | 8/1994 | Takishima et al. | 369/112 |
| 5,404,490 | 4/1995 | Matsubayashi et al. | 369/112 |

FOREIGN PATENT DOCUMENTS

| 191338 | 4/1989 | Japan | 369/112 |
|---|---|---|---|
| 6195795 | 7/1994 | Japan | 369/112 |

Primary Examiner—Georgia Y. Epps
Assistant Examiner—Tan Dinh
Attorney, Agent, or Firm—Oliff & Berridge

[57]                ABSTRACT

An optical pickup device having a simple structure due to many less components is disclosed. A laser beam generated in a laser diode is transformed into a parallel laser beam. The laser beam is irradiated onto a polarization beam splitter including a prism having a partially reflection coated layer on an oblique surface thereof, a mirror and a polarization beam splitting plane, the prism being formed at a first corner of a rectangle of a hexahedron, the mirror being formed at a second corner opposing the first corner, the polarization beam splitting plane being formed between the prism and the mirror on a line parallel with the partially reflecting coated layer, the line passing through a third corner, and the prism, the mirror and the polarization beam splitting plane being formed integrally in the hexahedron. The laser beam is irradiated onto a disc and the reflected light is split into a first polarization component and a second polarization component. The first and second polarization components are detected in a photo-detector to generate data signal. Compact optical pickup device can be manufactured. Also, the assembling work therefor is simplified to enhance the reliability of the optical pickup device.

11 Claims, 4 Drawing Sheets

OPTICAL PICKUP DEVICE FOR MAGNETO-OPTICAL DISC REPRODUCING SYSTEM

BACKGROUND OF THE INVENTION

1. Field of the Invention

The present invention relates to an optical pickup device for a magneto-optical disc reproducing system. More particularly, the present invention relates to an improved optical pickup device for a magneto-optical disc reproducing system for reading out data recorded on a magneto-optical memory medium.

2. Prior Arts

Recently, many efforts have been made for utilizing as a data recording medium a material having varied optical properties in accordance with the magnetic states thereof. As a result thereof, a magneto-optical disc has been developed. The magneto-optical disc has various polarized states of the reflected light in accordance with the magnetic states of the recorded layer of the magneto-optical disc. Using the differences between the polarized states, data can be recorded on a disc and read out from the disc, and a magneto-optical disc wherein such a principle is applied is used as a data memory medium of a large capacitance. In order to record data on the magneto-optical disc and read out the data recorded on the magneto-optical disc, an optical pickup device is formed by integrating a magnetic head and an optical head.

One example of such an optical pickup device is disclosed in U.S. Pat. No. 5,020,041. FIG. 1 is a schematic view for illustrating a magneto-optical memory system having a conventional optical pickup device disclosed in the above U.S. patent.

In the optical pickup device in the magneto-optical reproducing system as shown in FIG. 1, a magneto-optical disc 1 which is rotated by a rotation mechanism such as a rotary motor, includes a magneto-optical recording layer 101 having data recorded by a magneto-optical effect, a disc-shaped transparent substrate 103 towards an optical head 11 and a protection layer 102 towards a magnetic head 12. A light emitted from a light source which is a semiconductor laser 2 is collimated by a collimator lens 3 and directed to a focusing lens 5 mounted on an actuator 6 through a beam splitter 4. The light beam focused by focusing lens 5 is directed to the substrate 103 of the disc to thereby form a fine spot of approximately 1 μm in diameter on recording layer 101.

The focused light beam is polarized in accordance with the magnetic state of recording layer 101 and then reflected. The reflected light passes through focusing lens again and is reflected by beam splitter 4, and then is directed to a magneto-optical-signal detecting optical system 8 and a light point control signal detecting optical system 9 for detecting defocusing and off-track, by a beam splitter 7. Magneto-optical signal detecting system 8 is a differential signal detection system which is comprised of a λ/2 plate 801 and a polarization beam splitter 803. A light applied to magneto-optical signal detecting optical system 8 passes through λ/2 plate 801 and a lens 802, end is separated into two polarization components (S and P polarization components) by polarization beam splitter 803. The polarization components are detected by photo-detectors 804 and 805, respectively, and converted to electrical signals, which are differentiated by a differential amplifier 10, which in turn produces a magneto-optical signal.

A floating magnetic head 12 is arranged on the recording layer side which is on the opposite side to the optical head 11 with respect to disc 1. Floating magnetic head comprises a coil for applying a magnetic field to recording layer 101 and a slider for floating the head assembly and it floats by an air pressure created by the disk rotation while the disc rotates. The floating magnetic head 12 is integrally coupled to the optical head 11 by a support arm 15 so that it moves with the optical head 11 and the distance between both heads is kept constant.

Optical head 11 in the conventional optical pickup device as shown in FIG. 1 comprises a semiconductor laser 2 for generating a light, collimator lens 3 for collimating the light, beam splitter 4, focusing lens 5 for focusing the light beam passed through beam splitter 4 to form a fine spot on the disc recording layer, an actuator 6 for driving the focusing lens, beam splitter 7 for splitting the reflected light from disc 1 and directing this to the light point control signal detecting optical system 9 and magneto-optical signal detecting optical system 8 which comprises λ/2 plate 801, lens 802, a polarization beam splitter 803 and photo-detectors 804 and 805. Since the above conventional optical pickup head comprises a large number of members, it has a very complicated structure and has difficulties in maintaining precise positions between those members.

Another example of an optical pickup device is disclosed in U.S. Pat. No. 5,157,649 (issued to Masayuki Suzuki). FIG. 2 is a schematic view for illustrating an optical device disclosed in the above U.S. patent. The shown optical pickup device includes a collimator lens 33 for changing a light from a light source 31 into a parallel beam, a beam shaping prism 34 for shaping an elliptical shape of the parallel beam into a circular shape in cross section, a half-wave plate 35 for rotating the plane of polarization of the parallel beam having the circular shape by 90 degrees, a splitting plane 36A for vertically reflecting a light which has passed half-wave plate 35 with a radial direction of a disc, a beam directing prism 37 for directing the light reflected from splitting plane 36A to an objective lens 38, a half-wave plate 40 through which the reflected light from disc which has passed the objective lens 38, the beam directing prism 37 and the splitting plane 36A, a total reflection prism for directing the light which has passed half-wave plate 40 so as to be perpendicular to the radial direction of the disc, a polarization beam splitter 41 for splitting the directed beam into two beams, and two photo sensors 45 and 46 for sensing the two beams split by the polarization beam splitter respectively by using two convex lenses 42, a total reflection prism 44 and a Cylindrical lens 43.

The optical pickup device having the above structure does not having a protruding portion in the radial direction of the disc and therefore the overwhole size of the disc player may be compact. However, the structure of the disc player is very complicated and thus the optical head thereof becomes large. Also, there are many difficulties in controlling the precise positions of the components when manufacturing the disc player. This increases the manufacturing cost and the reliability of the disc player can not be ensured due to the difficult manufacturing. Therefore, the techniques for manufacturing a disc player having a simple structure which increases the reliability thereof and reduces the manufacturing costs have been required.

SUMMARY OF THE INVENTION

Therefore, it is an object of the present invention to provide an optical pickup device having a simple structure due to many less components.

Another object of the present invention is to provide an optical pickup device which has an improved reliability due to a simple manufacturing process.

To achieve the above objects of the present invention, there is provided an optical pickup device for a magneto-optical disc reproducing system, comprising:

a light source for generating a laser beam in parallel;

a prism for transmitting a first portion of the laser beam which is irradiated from a first direction, for reflecting a second portion of the laser beam into a second direction perpendicular to the first direction and for reflecting a beam which is irradiated from a third direction in opposition to the first direction into a fourth direction in opposition to the second direction;

a polarization beam splitting means for reflecting the first portion of the laser beam transmitted in the first direction into a fifth direction perpendicular to the first direction to irradiate the first portion onto a disc, for reflecting a first polarization component of a reflected beam irradiated onto the polarization splitting means from the disc in a sixth direction in opposition to the fifth direction to irradiate the first polarization component onto the prism in the third direction to be reflected in the fourth direction, for reflecting again in a seventh direction the first polarization component reflected in the fourth direction, for transmitting a second polarizaton component of a reflected beam irradiated from the disc in the sixth direction and for transmitting the second polarization component in an eighth direction which has the same direction with the seventh direction;

a mirror for reflecting the second polarization component passing the polarization beam splitting means into the eighth direction; and a photo-detector for detecting the first and second polarization components to thereby generate data signal.

For example, the light source may comprise a laser diode for generating an elliptic laser beam and a collimator lens for transforming the elliptic laser beam into a parallel laser beam in a circle shape. A converging lens may be provided for converging the first and second polarization components to thereby irradiate the first and second polarization components onto the photo-detector.

In accordance with one embodiment of the present invention, the prism, the polarization beam splitting means and the mirror are integrally formed in a cube so that the prism is formed at a first corner of a square of the cube, the mirror is formed at a second corner opposing the first corner and the polarization beam splitting means is formed at a diagonal line of the square between the prism and the mirror.

In accordance with another embodiment of the present invention, the prism, the mirror and the polarization beam splitting means are integrally formed in a (right-angled) hexahedron so that the prism is formed at a first corner of a (right-angled) rectangle of the hexahedron, the mirror is formed at a second corner opposing the first corner and the polarization beam splitting plane is formed on a diagonal line of a largest inscribed square having the first corner as a corner thereof within the rectangle, the first and second polarization components having separate beam paths to be irradiated onto the photo-detector. At this time, the first and second polarization components have separate-beam paths and are irradiated onto the photo-detector. In such a case, the photo-detector preferably comprises a first photo-detector for detecting the first polarization component and a second photo-detector for detecting the second polarization component.

The present invention also provides an optical pickup device for a magneto-optical disc reproducing system, comprising:

a light source for generating a laser beam in parallel;

a polarization beam splitting means for irradiating the laser beam onto a disc and splitting a reflected light into a first polarization component and a second polarization component, the polarization beam splitting means including a prism having a partially reflection coated layer on a oblique surface thereof, a mirror and a polarization beam splitting plane, the prism being formed at a first corner of a rectangle of a hexahedron, the mirror being formed at a second corner opposing the first corner, the polarization beam splitting plane being formed between the prism and the mirror on a line parallel with the partially reflecting coated layer, the line passing through a third corner, and the prism, the mirror and the polarization beam splitting plane being formed integrally in the hexahedron.

In the optical pickup device according to the present invention, almost all components thereof are formed integrally and therefore its structure is simple. Accordingly, compact optical pickup device can be manufactured. Also, the assembling work therefor is simplified to enhance the reliability of the optical pickup device. Further, after splitting the reflected light from the disc, the split polarization components can be separately signal-treated or can be converged in one beam in accordance with the signal processing method and necessity.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Hereinafter, the present invention will be explained in details with reference to the accompanying drawings.

Embodiment 1

Figure 1:
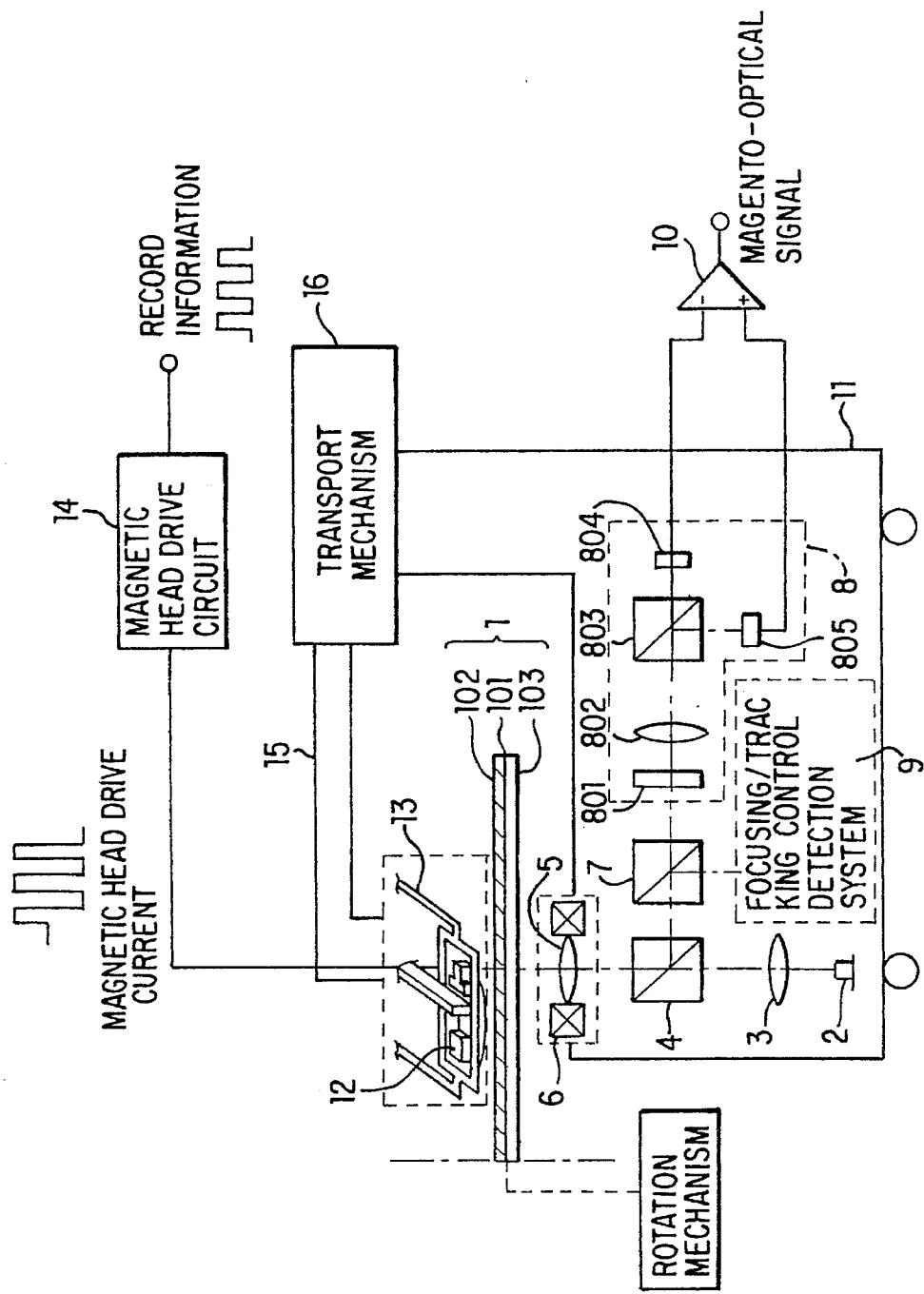
FIG. 1 is an schematic view for illustrating a magneto-optical memory system having a conventional optical pickup device.
Figure 2:
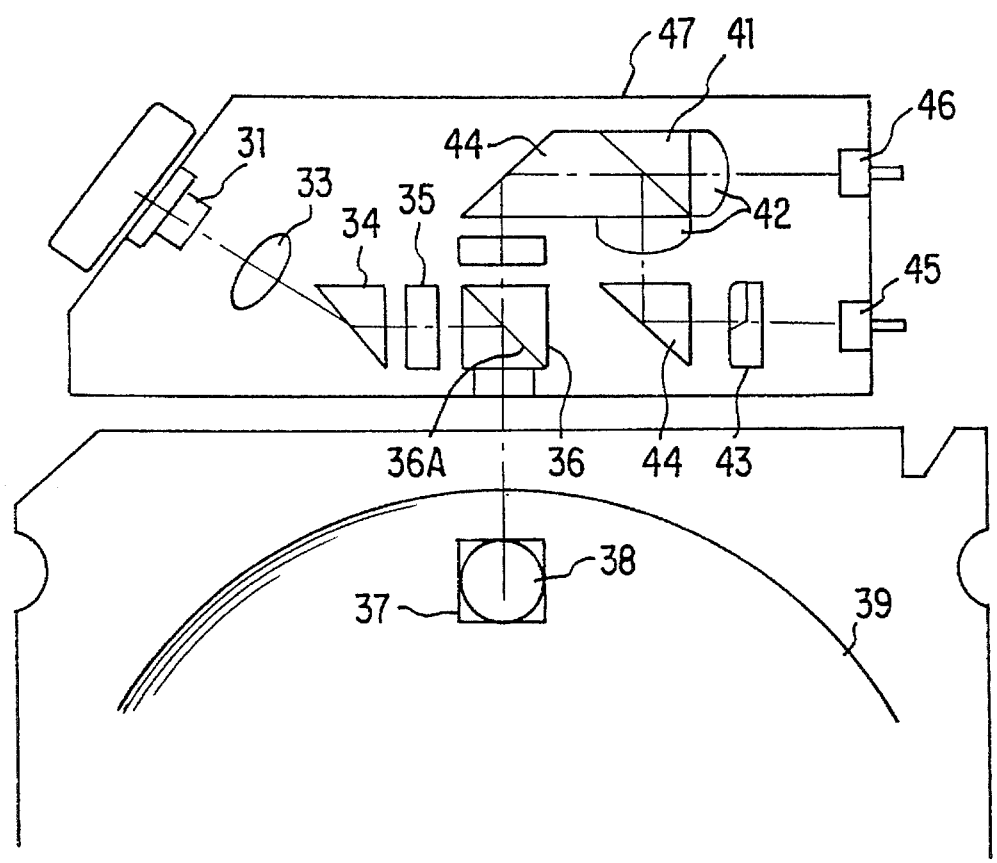
FIG. 2 is a schematic view for illustrating another conventional optical device.
Figure 3:
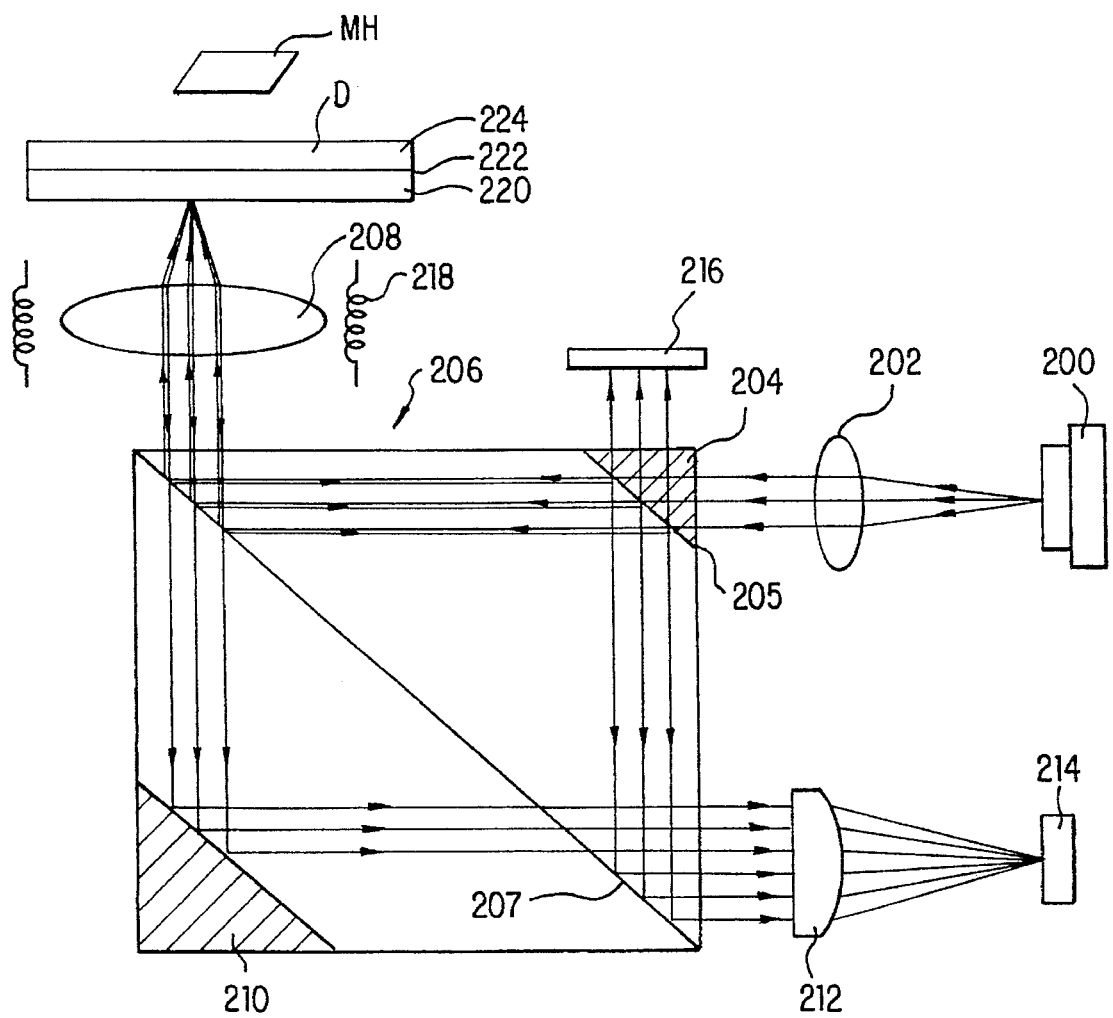
FIG. 3 is a schematic view for illustrating a first embodiment of an optical pickup device according to the present invention.

FIG. 3 is a schematic view for illustrating a first embodiment of an optical pickup device according to the present invention.

As shown in FIG. 3, the optical pickup device according to the present embodiment comprises a laser diode (a semiconductor laser) 200 which is a light source for generating an elliptic laser beam and a magnetic head (MH) for recording data on a disc (D) by using the magnetic characteristic. There is provided a collimator lens 202 for transforming (or shaping) the elliptic laser beam which has been generated from the laser diode 200 into a parallel laser beam in a circle shape. As shown in the figure, at a corner of (toward the direction in which the parallel laser beam is irradiated) the cube having a square-shaped cross section, a right-angled (half-square shaped) prism 204 is formed onto which the parallel laser beam from collimator lens 202 is irradiated. On the inner center-side surface (oblique plane of right-angled prism 204), a partially reflecting coated layer 205 is formed. In right-angled prism 204, a portion of the laser beam which has been irradiated from the right direction, is transmitted through partially reflecting coated layer 205 and the remainder portion is reflected by partially reflecting coated layer 205 to the upper direction which is vertical to the right direction. Further/the beam which is irradiated from the left direction is reflected to the lower direction by partially reflecting coated layer 205. Over right-angled prism 204, a detector 216 for detecting the initial beam output is equipped in order to control the output and frequency of the laser beam by receiving the laser beam which has been reflected to the upper direction by right-angled prism 204.

The optical pickup device is provided with a polarization bee splitter 206 having a polarization beam splitting plane 207 which has the operations of the reflection and transmission in accordance with the condition of the polarized light of the beam. Polarization beam splitting plane 207 is formed to be parallel with partially reflecting coated layer 205 of right-angled prism 204 at the diagonal line which connects the two opposing corners excluding the edges with right-angled prism 204. Polarization beam splitting plane 207 thus formed reflects a portion of the laser beam which has passed through right-angled prism 204 from the right direction into the upper direction and thereby irradiates the laser beam onto the disc D. According to the condition of the polarized light of the reflected light which is reflected from the disc and irradiated into the lower direction, polarization beam splitting plane 207 reflects a first polarized component into the right direction and thereby irradiating onto partially reflecting coated layer 205 from the left direction of prism 204 and to reflect the first polarized component to the lower direction and transmits a second polarized component of the incident reflecting light. At the lower portion of polarization beam splitting plane 207, the beam incident from the left direction is transmitted and the first polarization component which has been reflected to the lower direction of right-angled prism 204 is reflected to the right direction. As shown in the figure, at the left lower corner of the cube, a mirror 210 having a mirror surface for reflecting the second polarization component is transmitted from the polarization beam splitting plane into the right direction. The mirror surface of the mirror is formed to be parallel to polarization beam splitting plane of polarization 207 and partially reflecting coated layer 205. Mirror 210 totally reflects the light incident from the upper direction into the right direction.

In addition, over the upper left portion of the polarization beam splitter 206, a focusing lens 208 is provided for irradiating the reflected portion of the laser beam from polarization beam splitting plane 207 onto disc D. Focusing lens 208 also irradiates the reflected light from the disc D onto polarization beam splitting plane 207.

At the lower right side of splitting plane 206, a converging lens 212 is provided which converges the first polarization component and the second polarization component simultaneously which were divided by polarization beam splitting plane 207 and a photo-detector 214 which transforms the light received from converging lens 212 into the data signal is provided.

In the present embodiment, right-angled prism 204, a polarization bee splitter 206 for splitting the reflected laser beam, and mirror 201 for reflecting a polarized light split by polarization beam splitter 206 to irradiate this onto photo-detector 214 are integrally formed in a cube.

The following is an operation process of the optical pickup device according to the present embodiment.

In the present embodiment, as a light source for generating the laser beam for reading the data on the disk D, a laser diode 200 is used. The beam generated at this time may be a spot light source. The laser beam generated from laser diode 200 is transformed into a parallel laser beam by collimator lens 202 which is located in front of laser diode 200. A portion of the parallel laser beam is reflected vertically to the upper portion by partially reflecting coated layer 205 formed on the oblique plane of right-angled prism 204 and the reflected light is irradiated onto initial light output detector 216. In initial light output detector 216, by measuring the amount and wave of the incident light, the output and frequency of the laser beam generated at laser diode 200 are controlled according to the measured signal.

The other portion of the laser bee which has passed through right-angled prism 204 is reflected to the vertical upper direction at an upper portion of polarization beam splitting plane 207 (which is located at the diagonal part of the cube parallel to partially reflecting coated layer 205 of right-angled prism 204) and is irradiated onto focusing lens 208. The light incident into focusing lens 208 is converged in focusing lens 208 and scanned onto recording layer 222 of disc D. The light incident into recording layer 222 becomes polarized and reflected according to the magnetic state of the disc D. The reflected beam passes focusing lens 208 and is irradiated onto polarization beam splitting plane 207 of polarization beam splitter 206. At polarization beam splitting plane 207, the polarized components of the beam are divided. For example, in case that a P-polarized light passes, an S-polarized light is reflected. A first polarization component which was reflected by polarization beam splitting plane 207 is reflected again to the vertical lower direction at the rear surface of partially reflecting coated layer 205 of right-angled prism 104 and the first reflected polarization component is reflected again at the lower portion of polarization beam splitting plane 207 of polarization beam splitter 206 and is irradiated onto converging lens 212. The second polarization component which directly transmits polarization beam splitting plane 207 is reflected by mirror 210 which totally reflects the irradiated light and thereafter passes the lower portion of polarization beam splitting plane 207 and is irradiated onto converging lens 212 as a mean for converging a light. The first and second polarization components which have two light paths and are irradiated onto converging lens 212, are converged through converging lens 212 and irradiated onto photo-detector 214 and are transferred to the signal processing circuit (not shown) and are transformed into data signals.

In the optical pickup device according to the present embodiment, right-angled prism 204, polarization beam splitter 206 and totally reflecting mirror 210 are integrally formed in one structure.

The disc D comprises three layers, i.e., recording layer 222 onto which data are actually stored, transparent layer 220 which is transparent in order for the beam which is scanned at the disc to pass and protection layer 224 which is formed towards the magnetic head MH for protecting recording layer 222. When recording the data on the magneto-optical disc D, the output of the laser beam is increased and therefore, by the increased laser beam, the material of recording layer 222 of disc D to which the laser beam is scanned becomes active. At this time, the magnetic head MH which is united with the optic head records the data by magnetizing the active recording layer 222 in accordance with the electric signals.

The light which was irradiated onto recording layer 222 is selectively polarized according to the magnetic state thereof and the status of the polarized light is detected and transformed into the data. Focusing lens 208 is controlled by a focus controlling coil 218 and thereby forms an exact focus of the beam on the disc D.

In the optical pickup device according to the present embodiment, detector 216 for detecting the initial light output is included to thereby sense the output and frequency of the laser beam by receiving the initial laser beam which is partially reflected from right-angled prism 204.

According to the optical pickup device of the optical magnetic disc reproducing system, a right-angled prism, a polarization beam splitter which divides the polarized components of the laser beam, and a prism mirror which reflects the laser beam to the photo-detector may be integrally formed. Therefore, the structure of the optical pickup device becomes simple and the manufacture thereof also becomes simple.

Embodiment 2

In embodiment 1, the two polarization components for example, S-polarization component and P-polarization component which were divided by polarization beam splitter 206 are converged by one converging lens 212 and irradiated onto one photo-detector and thereby signal processing is accomplished. However, if necessary it is sometimes necessary to process the optic signals which were received through two photo-detectors by respectively dividing the two polarization components. The present embodiment shows the optical pickup device which can be applicable in this case.

Figure 4:
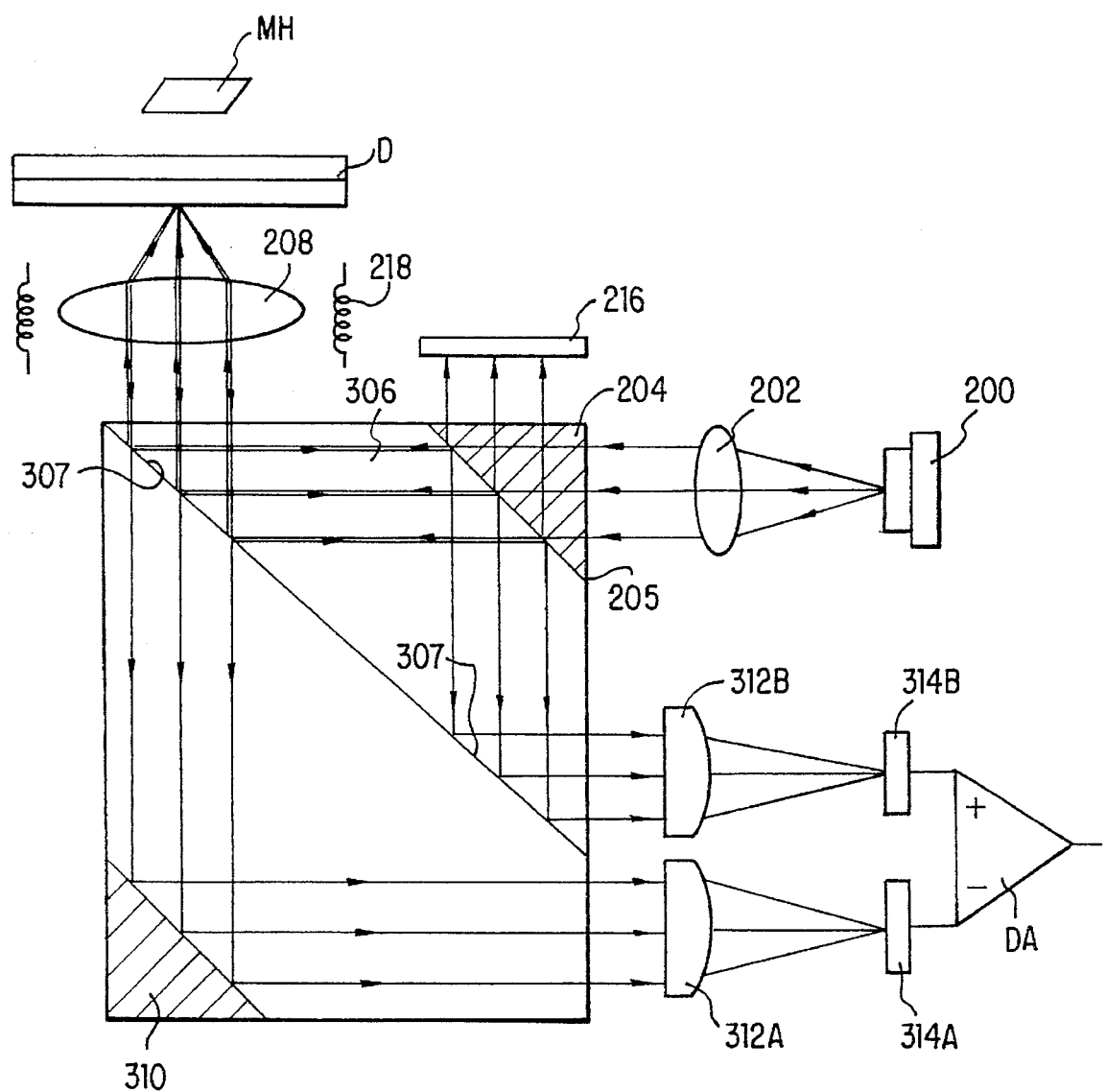
FIG. 4 is a schematic view for illustrating a second embodiment of the optical pickup device according to the present invention.

FIG. 4 is a schematic view for illustrating a second embodiment of the optical pickup device according to the present invention. As described in FIG. 4, the optical pickup device according to the present embodiment has the same structure as the optical pickup device of Embodiment 1 except some changes in the polarized splitter, the converging lens and the photo-detector among the components of the Embodiment 1. In the present embodiment, the polarization beam splitter 306 having a polarization beam splitting plane 307, a right-angled prism 204 and a mirror 310 are integrally formed in the form of a right-angled hexahedron. The above hexahedron has a cross-sectional rectangle having a side onto which the laser beam is irradiated and is longer than a side towards the disc D. As in Embodiment 1, right-angled prism 204 is formed at the corner of the laser beam incident side of the right-angled hexahedron having partially reflecting coated layer 205 formed on the oblique plane thereof and polarization beam splitting plane 307 which passes one corner (disc side) of the hexahedron, polarization beam splitting plane being parallel with partially reflecting coated layer 205. At the edge opposing the edge at which right-angled prism 204 is formed, a mirror 310 having a mirror surface which is parallel with polarization beam splitting plane 307 is formed.

In the optical pickup device according to the present embodiment, as described in Embodiment 1, the laser beam which was generated at laser diode 200 is transformed to a parallel beam by collimator lens 202. A portion of the parallel Laser beam is reflected through the right-angled prism 204 and is irradiated onto initial light output detector 216 and the other portion of the laser beam which has passed right-angled prism 204 is reflected at polarization beam splitting plane 307 of polarization beam splinter 306 and is irradiated onto focusing lens 208. The reflected beam which was polarized according to the magnetic state of the disc D passes focusing lens 208 and is irradiated onto polarization beam splitting plane 307 of polarization beam splitter 306.

A first polarization component reflected from the upper part of polarization beam splitting plane 204 is reflected again to the vertical lower direction by partially reflecting coated layer 205 of the oblique plane of the right-angled prism 204. At this time only the reflected beam from partially reflecting coated layer is reflected by the lower portion of polarization beam splitting plane 307 of polarization beam splitter 306. The beam which has been reflected from the lower portion of polarization beam splitting plane 307 is irradiated onto a second converging lens 312B. A second polarization component which directly passed the upper portion of polarization beam splitting plane 307 is reflected by mirror 310 which is located at a lower position than that of Embodiment 1 and is totally reflected and thereafter without passing the lower portion of polarization beam splitting plane 307 it is directly irradiated onto a first converging lens 312A. Therefore, the second polarization component is not overlapped with the first polarization component which was reflected by the lower portion of polarization beam splitting plane 307. Consequently, the divided polarization components are received by a first and second photo-detectors 314A and 314B and transformed into the data signals by the separate first and second photo-detectors 314A and 314 B respectively.

Among the integrally combined right-angled prism 204, polarization beam splitter 206 and mirror 310, by forming mirror 310 in the form of a hexahedron in order to position it at the lower position than that in Embodiment 1, one of the polarized components which was reflected by the mirror is directly irradiated onto converging lens 312A and converged into first photo-detector 314A without passing the lower portion of polarization beam splitting plane 307 of polarization beam splitter 306. In addition, since another polarization component which is polarized and reflected from polarization beam splitting plane 306 of polarization beam splitter 307 is not overlapped with the first polarisation component which was reflected from mirror 310 and reflected by the lower portion of polarization beam splitting plane 307 of polarization beam splitter 306, it is irradiated onto second converging lens 312B and converged into second photo-detector 314B. At this time, the signal difference received by the first and second photo-detectors 314A and 314B is amplified by the differential amplifier DA and transformed into a positive or negative signal.

The optical pickup device having the structure according to the present embodiment has the advantage that the hexahedron can be adequately changed if necessary in accordance with the design change of the optical pickup device when acquiring information through the beam which is reflected and contains the information signal. Further, when an additional photo-detector is necessary in order to obtain the additional information from the beam which was reflected from the disc, by simply dividing the lower portion of the polarization beam splitting plane so as to have the different reflecting angles, the portion of the reflected beam which was reflected from the lower portion of the polarization beam splitting plane can be toward the additional photo-detector.

In the optical pickup device which has been described so far, not only the number of the components which were a shortcoming of the conventional technology is considerably reduced, but also it also overcomes the difficulty which can be raised in using the components which should be kept in the precise positions therebetween by integrally forming these. In addition, in the optical pickup device according to the present invention, since the establishment of the components in the radial direction of the disc is unnecessary, its structure can become compact. It is also possible to split the necessary beam or to simply change the direction of the beam by simply changing the positions and shapes of the mirror and the polarization beam splitting plane. The advantage of the present invention as described above is not only to reduce the assembling and manufacturing cost of the optical pickup device, but also to obtain the excellent reliability and stability in the course of storing or reading the data on the disc.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An optical pickup device for a magneto-optical disc reproducing system, comprising:

a light source for generating a laser beam in parallel;

a prism for transmitting a first portion of said laser beam which is irradiated from a first direction, for reflecting a second portion of said laser beam into a second direction perpendicular to said first direction and for reflecting a beam which is irradiated from a third direction in opposition to said first direction into a fourth direction in opposition to said second direction;

polarization beam splitting means for reflecting said first portion of said laser beam transmitted in the first direction into a fifth direction perpendicular to said first direction to irradiate said first portion onto a disc, for reflecting a first polarization component of a reflected beam irradiated onto said polarization beam splitting means from the disc in a sixth direction in opposition to the fifth direction to irradiate the first polarization component onto said prism in the third direction to be reflected in the fourth direction, for reflecting again in a seventh direction said first polarization component reflected in the fourth direction, for transmitting a second polarization component of a reflected beam irradiated from the disc in the sixth direction, and for transmitting the second polarization component in an eighth direction which has the same direction with the seventh direction;

a mirror for reflecting the second polarization component passing said polarization beam splitting means in the eighth direction; and a photo-detector for detecting the first and second polarization components to thereby generate data signal.

2. The optical pickup device as claimed in claim 1, wherein said light source comprises a laser diode for generating an elliptic laser beam and a collimator lens for transforming the elliptic laser beam into a parallel laser beam in a circular shape.

3. The optical pickup device as claimed in claim 1, said optical pickup device further comprising a converging lens for converging the first and second polarization components to thereby irradiate the first and second polarization components onto said photo-detector.

4. The optical pickup device as claimed in claim 1, wherein said prism, said polarization beam splitting means and said mirror are integrally formed in a cube so that said prism is formed at a first corner of a square of the cube, said mirror is formed at a second corner opposing the first corner and said polarization beam splitting means is formed at a diagonal line of the square between said prism and said mirror.

5. The optical pickup device as claimed in claim 1, wherein said prism, said mirror and said polarization beam splitting means are integrally formed in a hexahedron so that said prism is formed at a first corner of a rectangle of the hexahedron, said mirror is formed at a second corner opposing the first corner and said polarization beam splitting plane is from on a diagonal line of a largest inscribed square having the first corner as a corner thereof within the rectangle, said first and second polarization components having separate beam paths to be irradiated onto said photo-detector.

6. The optical pickup device as claimed in claim 5, wherein said photo-detector comprises a first photo-detector for detecting the first polarization component and a second photo-detector for detecting the second polarization component.

7. The optical pickup device as claimed in claim 6, said optical pickup device further comprising a first converging lens for converging the first polarization component and a second converging lens for converging the second polarization component.

8. The optical pickup device as claimed in claim 1, wherein said mirror is a totally reflecting mirror.

9. The optical pickup device as claimed in claim 1, said optical pickup device further comprising a detector for detecting an initial beam output in order to control an output and a frequency of a laser beam by receiving a second portion of the laser beam which has been reflected to the second direction by said prism.

10. An optical pickup device for a magneto-optical disc reproducing system, comprising:

a light source for generating a laser beam in parallel;

a polarization beam splitting means for irradiating said laser beam onto a disc and splitting a reflected light into a first polarization component and a second polarization component, said polarization beam splitting means including a prism having a partially reflection coated layer on an oblique surface thereof, a mirror and a polarization beam splitting plane, said prism being formed at a first corner of a rectangle of a hexahedron, said mirror being formed at a second corner opposing said first corner, said polarization beam splitting plane being formed between said prism and said mirror on a line parallel with said partially reflecting coated layer, said line passing through a third corner, and said prism, said mirror and said polarization beam splitting plane being formed integrally in said hexahedron.

11. The optical pickup device as claimed in claim 10, wherein said polarization beam splitting means has a cubic shape.

\* \* \* \* \*